UNITED STATES PATENT OFFICE.

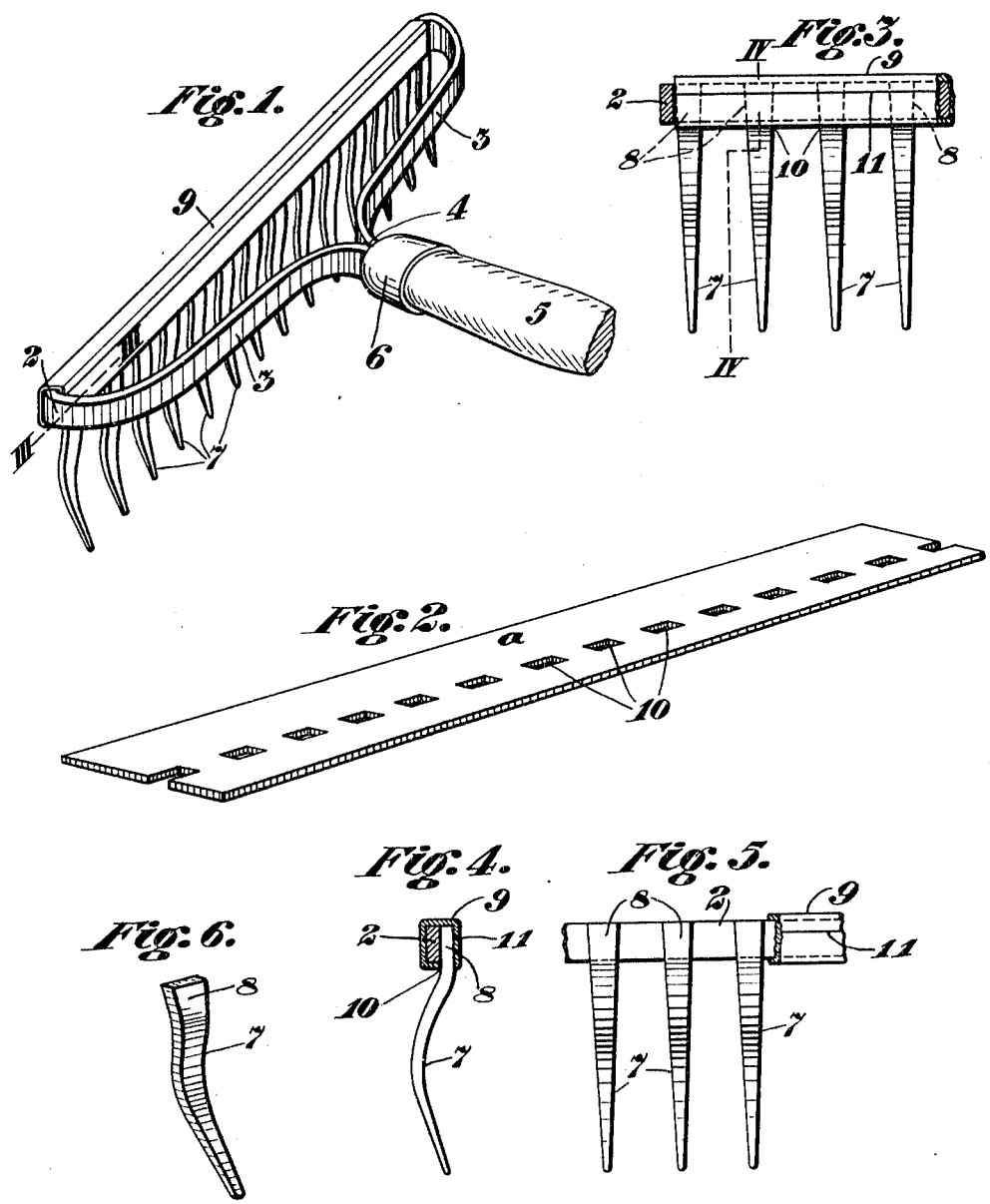

EDWARD G. CRONK, OF MONTOUR FALLS, NEW YORK, ASSIGNOR TO THE CRONK & CARRIER MANUFACTURING COMPANY, OF ELMIRA, NEW YORK, A CORPORATION OF NEW YORK.

RAKE.

1,118,396.

Specification of Letters Patent.

Patented Nov. 24, 1914.

Application filed December 11, 1913. Serial No. 805,941.

*To all whom it may concern:*

Be it known that I, EDWARD G. CRONK, a citizen of the United States, residing at Montour Falls, in the county of Schuyler and State of New York, have invented certain new and useful Improvements in Rakes, of which the following is a specification.

My invention consists of an improvement in garden and other rakes, and has for its object to provide a strong, durable tool of this class, made entirely of high carbon wrought steel or other available or suitable metal, having a handle portion.

An important feature of improvement in the invention is the manner in which the several parts are assembled and connected by several welding processes, whereby to effect a practically integral or homogenous construction, combining the head of the rake with the several teeth and surrounding enveloping shrouding or shell, and securing tang portions constituting the connection between the head and the rake handle, providing ample strength and stiffness, in the manner more fully hereinafter described.

The invention is illustrated in the accompanying drawings, in which—

Figure 1 is a perspective view of the complete rake. Fig. 2 is a perspective view of the blank for the surrounding shell forming a portion of the head. Fig. 3 is a sectional detail view in elevation, showing a portion of the head of the rake and teeth. Fig. 4 is a cross sectional view, indicated by the line IV. IV. of Fig. 3. Fig. 5 is a sectional detail view, similar to Fig. 3, showing the teeth and a portion of the inner head member to which they are secured by welding. Fig. 6 is a perspective detail view of one of the teeth, detached.

The head portion of the rake consists of a main inner bar member 2, co-extensive with the length of the rake head, and which is reversed backwardly and inwardly at each end thereof, as indicated at 3, 3, suitably curved and brought together at the point 4, to provide a doubled tang portion which is inserted in the well-known manner inwardly of the central end of the handle 5, preferably with the usual ferrule 6. The head 2, in such construction, is thus continuous throughout the entire length of the rake head proper, and with its extensions 3, 3, provides for a direct connection with the handle, thus insuring ample stiffness and strength.

The several teeth 7, which may be punched or sheared from sheet metal, and suitably bent to any desired formation, are preferably tapered toward their points, and considerably widened at their head portions 8, the edges of which also diverge in wedge form. The teeth as thus made, are suitably spaced and laid upon the inner face of the main bar 2 and secured thereto, preferably by any suitable welding operation, the electrical welding process being preferable and well adapted for such purpose. A surrounding sheathing or casing 9 of rectangular box form, made from the blank $a$ shown in Fig. 2, is then pressed or formed around the bar 2 and the affixed teeth 7, the blank $a$ being provided with a series of rectangular openings 10, registering with the several teeth, and snugly embracing their shank portions immediately below their juncture with the bar 2. The shell 9, as thus made, and tightly pressed around the main bar and top portions of the teeth, and brought together at its meeting edges, at any suitable point, as indicated at 11, is then also welded together and to the bar 2 and upper portions of the teeth. By this construction, the teeth are not only rigidly reinforced and firmly connected with the bar, but the entire head of the rake is stiffened and reinforced, giving it ample body and heft.

The form of bar 2, being of considerably greater depth and thickness, greatly assists in maintaining a strong, unyielding connection with the handle portion.

It will be understood that the proportions of the rake, number and size of the teeth, the design or details of the various parts, or other features of the invention, may be variously changed or modified by the skilled mechanic, but that all such changes are to be considered as within the scope of the following claims.

What I claim is:

1. A rake consisting of a continuous metallic bar bent together to form a central handle connection, a plurality of teeth having their heads welded thereto, and a surrounding embracing shell portion inclosing the bar and the heads of the teeth and welded thereto, substantially as set forth.

2. A rake consisting of a continuous metallic bar bent together to form a central handle connection, a plurality of teeth having their heads welded thereto, and a surrounding embracing shell portion welded to the main bar and the heads of the teeth.

3. In a rake, the combination of a main bar having a straight middle portion and bent terminals forming handle connecting portions, a plurality of teeth secured by their heads to the middle portion, and a surrounding enveloping shell having openings for the teeth shanks and tightly embracing the teeth and bar and welded thereto, substantially as set forth.

4. In a rake, the combination of a main bar having a straight middle portion and bent terminals forming handle connecting portions, a plurality of teeth having tapered head portions secured thereto, and a surrounding enveloping shell having openings for the teeth shanks and tightly embracing the teeth and the middle portion of the bar and welded thereto, substantially as set forth.

In testimony whereof I hereunto affix my signature in the presence of two witnesses.

EDWARD G. CRONK.

Witnesses:
W. D. BOWLBY,
H. W. HALL.

Copies of this patent may be obtained for five cents each, by addressing the "Commissioner of Patents, Washington, D. C."